(12) United States Patent
Kinsella

(10) Patent No.: US 6,789,711 B2
(45) Date of Patent: Sep. 14, 2004

(54) STABLE PRODUCT HOLDING AND TRANSPORTING SYSTEM

(76) Inventor: Jason P. Kinsella, 63 Via Pico Plz., No. 410, San Clemente, CA (US) 92672

( * ) Notice: Subject to any disclaimer, the term of this patent is extended or adjusted under 35 U.S.C. 154(b) by 61 days.

(21) Appl. No.: 10/351,212

(22) Filed: Jan. 24, 2003

(65) Prior Publication Data

US 2004/0144782 A1 Jul. 29, 2004

(51) Int. Cl.[7] .................................................. B60R 5/04
(52) U.S. Cl. ............................ 224/275; 224/498; 220/7
(58) Field of Search .......................... 206/597; 224/275, 224/498; 220/7

(56) References Cited

U.S. PATENT DOCUMENTS

| | | |
|---|---|---|
| 3,388,886 A | 6/1968 | Tucker |
| 3,828,994 A | 8/1974 | Hollins |
| 3,986,656 A | 10/1976 | November |
| 4,226,348 A | 10/1980 | Dottor et al. |
| 4,305,519 A | 12/1981 | Gerich |
| D285,885 S | 9/1986 | Cusenza et al. |
| D302,062 S | 7/1989 | Sable |
| 5,354,119 A | 10/1994 | Nicholas |
| 5,415,457 A | 5/1995 | Kifer |
| 5,419,471 A | 5/1995 | Polumbaum et al. |
| 5,803,325 A * | 9/1998 | Wang .......................... 224/275 |
| 5,829,655 A * | 11/1998 | Salopek ....................... 224/402 |
| D415,730 S | 10/1999 | Jacobsmeyer |
| 5,996,865 A * | 12/1999 | Bissey ......................... 224/275 |
| 6,053,570 A | 4/2000 | Stern et al. |
| 6,062,452 A | 5/2000 | Kauskey |
| 6,135,332 A | 10/2000 | Eleam |
| 6,206,224 B1 | 3/2001 | Potts et al. |
| 6,276,582 B1 | 8/2001 | Alexander |
| 6,588,821 B2 * | 7/2003 | Worrell et al. ............. 296/37.8 |

* cited by examiner

*Primary Examiner*—Joseph Man-Fu Moy
(74) *Attorney, Agent, or Firm*—Fulwider Patton Lee & Utecht LLP

(57) ABSTRACT

A stable product holding system or assembly includes a vertical panel, a stabilizing panel pivotally hinged to the vertical panel for triangular bracing, and a base panel pivotally secured to the lower edge of the vertical panel. In addition, broad strapping arrangements are secured to the ends of the vertical panel to hold products against the vertical panel. The assembly is fully collapsible, with the straps holding the panels firmly against one-another to provide a compact unit for storage.

20 Claims, 2 Drawing Sheets

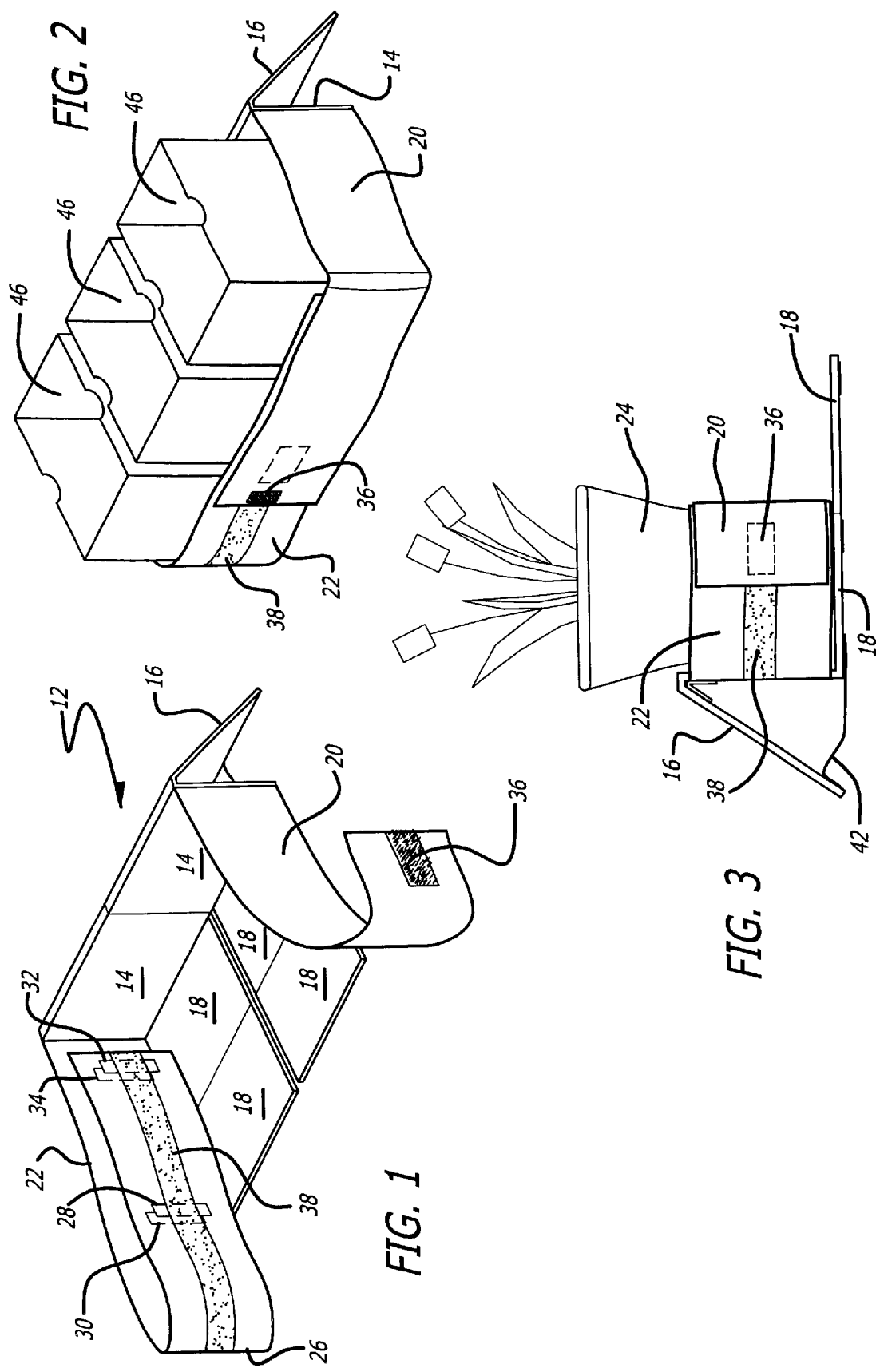

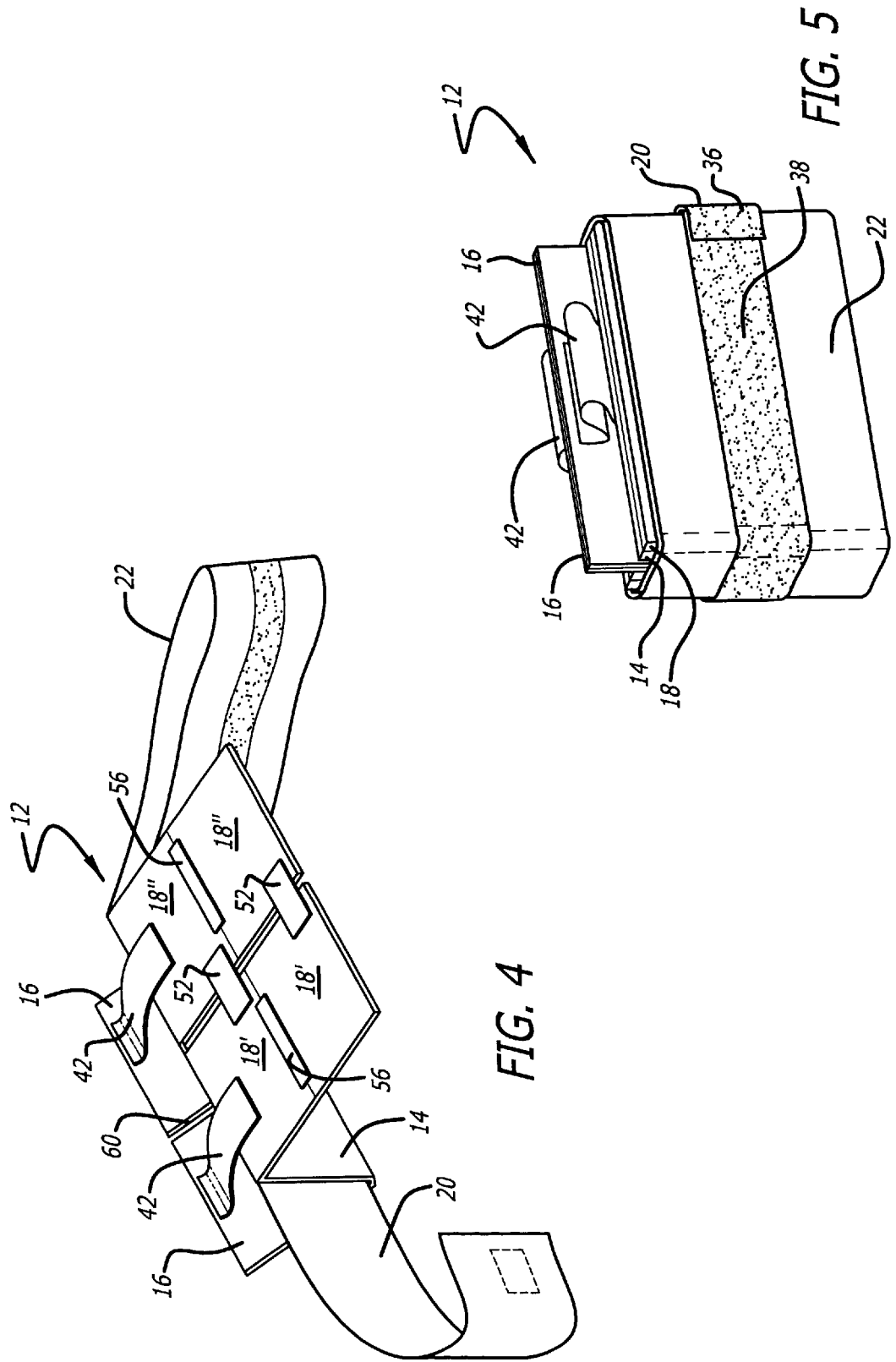

STABLE PRODUCT HOLDING AND TRANSPORTING SYSTEM

FIELD OF THE INVENTION

This invention relates to arrangements for holding and transporting products in a stable upright configuration.

BACKGROUND OF THE INVENTION

When taking groceries home from the supermarket or transporting other products, it is desirable to hold the products in a stable upright orientation. Various arrangements have been proposed heretofore for this purpose and they are disclosed in the following U.S. Patent: U.S. Pat. No. 3,388,886; U.S. Pat. No. 3,828,994; U.S. Pat. No. 3,986,656; U.S. Pat. No. 4,226,348; U.S. Pat. No. 4,305,519; U.S. Des. Pat. No. 285,885; U.S. Des. Pat. No. 302,062; U.S. Pat. No. 5,354,119; U.S. Pat. No. 5,415,457, U.S. Pat. No. 5,419,471; U.S. Des. Pat. No. 415,730; U.S. Pat. No. 6,053,570; U.S. Pat. No. 6,062,452; U.S. Pat. No. 6,135,332; U.S. Pat. No. 6,206,224 and U.S. Pat. No. 6,276,582.

However, these arrangements have various shortcomings, including lack of versatility, and/or taking up too much space when not in use, for examples.

SUMMARY OF THE INVENTION

An important object is to overcome the shortcomings of prior proposed arrangements in this field, and to provide a self-standing product holding and transporting assembly which is stable, versatile, expandable, and which may be folded down into a very compact unit when not in use.

In accordance with one specific illustrative embodiment of the invention, a vertical panel extends upward from a support surface, and has a stabilizing panel pivotally mounted to the upper edge of the vertical panel and extending to the supporting surface at an angle to provide triangular bracing; a base panel is pivotally coupled to the lower edge of the vertical panel and strapping arrangements extend from the side edges of the vertical panel to hold products in a stable vertical orientation mounted at least in part on the base panel.

Incidentally, the various panels involved in the present invention may include two or more parallel panels pivotally mounted together, and such panel constructions are to be included in the present patent specification and claims when reference is made to a "panel" or "panels".

Various aspects and features which may be included in the holding and transporting system may selectively include one or more of the following:

1. Hook and loop type fastening pads or strips (of the Velcro® type) may be provided to secure the straps together or to the panels.
2. Flexible couplings between panels may be of resilient material to provide biasing force toward the open, product receiving configuration.
3. The panels may be folded against one-another, and held by the strapping arrangements to form a small compact configuration when the assembly is not in use.
4. The strapping arrangements may include two straps, with one long strap folded back on itself for convenience in restraining relatively small products or sets of products, while still having the extra length useful for holding a substantially number of bags of groceries, for example.
5. The panels may be formed of solid plastic sheet material, or of stiff pressed board, covered with thin flexible plastic sheet material.
6. Regarding the number of panels, the assembly preferably has at least one vertical panel, one stabilizing panel and one base panel. However, in one advantageous arrangement, the assembly includes two hinged vertical panels, two hinged stabilizing panels and two or four hinged base panels.
7. To permit compact storage of the assembly when not in use, the hinges intercoupling at least some of the panels maybe be implemented by extensible tapes, which extend as the multiple panels are folded into a stack of panels. These extensible tapes, similar to ACE® bandage tapes, have the additional advantage of biasing the panels to the open configuration, facilitating preparation of the system to receive the products to be held upright and transported.
8. The stabilizing panel may be pivotally secured to the vertical panel either at the upper edge or spaced down from the upper edge of the vertical panel, to provide triangular bracing.
9. A single strap may be employed, optionally, instead of the two straps.

Other objects, features and advantage of the invention will become apparent from a consideration of the following detailed description and from the accompanying drawings.

BRIEF DESCRIPTION OF THE DRAWINGS

FIG. 1 is a perspective view of a system or assembly illustrating the principles of the invention, with the product retention straps open;

FIG. 2 is a perspective view with grocery bags being held upright;

FIG. 3 is a side elevational view showing a plant being held in the vertical orientation;

FIG. 4 is a bottom perspective view showing the straps and hinge arrangements; and FIG. 5 is a perspective view of the holding system in the folded up configuration for storage.

DETAILED DESCRIPTION OF THE PREFERRED EMBODIMENTS

While the specification describes particular embodiments of the present invention, those of ordinary skill can devise variations of the present invention without departing from the inventive concept.

Referring more particularly to the drawings, FIG. 1 is a perspective view of a specific embodiment of a product holding and transporting system or assembly 12. The assembly 12 includes a pair of vertical panels 14, a pair of stabilizing or bracing panels 16 (only one of which is visible in FIG. 1), and four base panels 18. In addition, the assembly is provided with two wide straps, a short strap 20 and a long strap 22. For convenience in handling relatively small products, such as a single grocery bag or a flower pot 24 (see FIG. 3), the strap 22 may be folded along a vertical line 26 and secured in a doubled-over configuration by mating hook and loop pads 28 and 30, and pads 32 and 34 on the facing sides of strap 22.

The short strap 20 has a hook or loop type pad 36 on the inside surface of the outer end thereof; and the longer strap 22 has a mating strip 38 of hook or loop type material extending for its entire length. Once products are mounted on the base panels 18, the strap 22 is folded around the products, and the shorter strap 20 in brought around so that the hook pad 36 locks into the loop type strip 38 on strap 22, thereby holding the products in the upright configuration.

It is further noted that the stabilizing panels 16 are resiliently coupled to the bottom side of base panels 18 by the flexible and bendable plastic strips 42, which bias panels 16 away from vertical panels 14, providing triangular bracing for the assembly.

FIG. 2 is a schematic showing of grocery bags 46 mounted against vertical panel 14, with panels 16 in their open brace position. Further, the shorter strap 20 is secured to the longer strap 22 by the mating hook and loop material 36 and 38.

FIG. 3 shows a flower pot 24 resting on base panels 18 with straps 20 and 22 holding the pot upright as the Velcro® type hook and loop material 36, 38 hold the straps together.

FIG. 4 is a bottom perspective view, showing the thin strips of bendable plastic 42 which bias the stabilizing panels 16 away from the vertical panels 14. In addition the strips 52 coupling base panels 18' and 18" together, are shown. These strips 52 are formed of resilient tape material similar to ACE® bandage material so they will bias the base panels 18 together, but will extend to permit folding when the system in its collapsed configuration, see FIG. 5.

The fully collapsed configuration of the system 12 in shown in FIG. 5 with the two stabilizing panels extending above the other panels, and with the vertical panels 14 being immediately adjacent the central stabilizing panels 16 on both sides thereof.

To reach the fully collapsed configuration, the outer panels 18 are pivotally folded under the inner panels 18 with tapes 56 providing the pivot function. The doubled panels 18 are then folded up against the vertical panels 14 (see FIG. 1) and the longer stabilizing panels are folded against the other side of vertical panels 14. The two halves of the unit are then folded together along the axis 60 which is at the outer surface of panels 16, with the resilient tapes 52 transversely interconnecting base panels 18, extending as this last panel folding step is accomplished. The entire assembly is then secured closed by straps 20 and 22.

Concerning dimensions and modifications, one preferred embodiment as shown in the drawings and described hereinabove, includes two vertical panels which are 6 inches high and nine inches wide, two stabilizing panels of the same width, but 7 inches high, and base panels of the same width, but with the inner base panels 6 inches in the front to rear direction, and outer base panels 5 inches in the front-to-rear direction. In another alternative only one vertical and one bracing panel was use. The vertical panel was about 6 inches high and 18 inches long; and the bracing panel was 18 inches long and about 7½ inches high. Only two base panels both 18 inches in width were used, and both the inner and outer base panels had a front-torear extent of six inches.

A third embodiment had two foldable vertical panels 6 by 9 inches, and a matching pair of foldable bracing panels 7½ inches by 9 inches, and only two foldable side-by-side base panels both pivotally secured to the bottom of the vertical panels, and both being 9 inches wide and about 10 inches deep.

The straps in each case were about 5½ inches wide.

It is further noted that a typical supermarket paper bag has a bottom measuring about 12 inches by 7 inches and is about 17 inches high. Accordingly, with vertical panels about six inches high, and broad straps for extending around the grocery bags at a height nearly as high as the vertical panels grocery bags, as well as products in plastic bags or in other configurations, are firmly held in place. More generally the vertical panels and the upper edges of the broad tapes are preferably at least four inches high, and need not be more than 7 or 8 inches high.

Regarding materials for construction, the panels may be formed of solid plastic sheet material; or may be formed of pressed board or even of cardboard box type material with outer flat sheets and inner corrugated spacing material; and these rigid or semi-rigid materials for the panels may be covered with thin, flexible plastic sheet material or with cloth.

It is to be understood that various changes and modifications may be made without departing from the spirit and scope of the invention. Thus, by way of example and not of limitation, instead of two straps, only one may be used, with the single strap being secured at one end to the vertical support, and having hook and loop type adjustable arrangements for holding product, with the free end of the strap engaging the vertical panel or the stabilizing panel. Regarding the stabilizing panel, it is preferably pivotally mounted to the upper edge of the vertical panel but may be pivotally mounted to the vertical panel part way down the vertical panel. As a further alternative, the stabilizing panels may be triangular in shape, and may be pivoted from the ends of the vertical panel. Also, instead of base panels, the system may include flexible cloth, fabric, or very thin sheet material secured to the lower edge of the vertical panel, on which the packages may rest.

In addition, regarding intercoupling of the panels, any suitable arrangements for implementing the disclosed functions, such as high strength plastic tape with permanent adhesive, flexible and resilient tapes, or other equivalent products, may be employed. Accordingly, the present invention is not limited to the specific embodiments described in detail hereinabove and/or shown in the drawings.

I claim:

1. A collapsible product holding and transporting system comprising:
    a vertical panel for extending upwardly from a support surface;
    a stabilizing panel hingedly mounted to said vertical panel and extending angularly to the support surface to form a triangular bracing structure;
    a flexible coupling extending between the lower edges of said vertical panel and said stabilizing panel;
    a base panel pivotally coupled to the lower edge of said vertical panel to extend along the support surface in the direction opposite from said stabilizing panel; and
    strap arrangements extending laterally from said vertical panel to secure packages upright against said vertical panel and resting on said base panel.

2. A system as defined in claim 1 wherein said flexible coupling biases said stabilizing panel to angle said stabilizing panel, away from said vertical panel.

3. A system as defined in claim 1 wherein said stabilizing panel is wider than said vertical panel.

4. A system as defined in claim 1 wherein said strapping arrangements have at least one-half the vertical extent of said vertical panel.

5. A system as defined in claim 1 further comprising hook and loop type fastening arrangements for locking said strapping arrangements both around the products and around the panels in the collapsed configuration of said assembly.

6. A system as defined in claim 1 wherein said vertical panels are between 4 and 8 inches high.

7. A system as defined in claim 1 wherein said strapping arrangements are at least 3 inches wide.

8. A system as defined in claim 1 wherein two pivotally interconnected vertical panels are provided.

9. A system as defined in claim 1 wherein flexible coupling between at least some of said panels is implemented by resilient tapes which are both flexible and extensible.

10. A system as defined in claim 1 wherein said system is collapsible to a stored configuration with said panels stacked against one another, and with said strapping arrangements holding the panels in this stored configuration.

11. A system as defined in claim 1 wherein said strapping arrangements include two straps, secured to said vertical panel at spaced points on said vertical panel.

12. A system as defined in claim 11 wherein one of said straps has hook type material thereon and the other of said straps has loop type material thereon.

13. A collapsible product holding and transporting system comprising:
- a vertical panel for extending upwardly from a support surface;
- a stabilizing panel hingedly mounted to said vertical panel and engaging the support surface outward from said vertical panel;
- base material secured to the lower edge of said vertical panel to extend along the support surface in the direction opposite from said stabilizing panel; and
- strap arrangements extending laterally from at least one side edge of said vertical panel to secure packages upright against said vertical panel and resting on said base material.

14. A system as defined in claim 13 wherein said strapping arrangements have at least one-half the vertical extent of said vertical panel.

15. A system as defined in claim 13 further comprising hook and loop type fastening arrangements for locking said strapping arrangements both around the products and around the panels in the collapsed configuration of said assembly.

16. A collapsible product holding and transporting system comprising:
- a pair of vertical panels for extending upwardly from a support surface;
- a pair of stabilizing panels hingedly mounted to said vertical panel and extending angularly to the support surface to form a triangular bracing structure;
- a flexible coupling extending between the lower edges of said vertical panels and said stabilizing panels;
- a pair of base panels pivotally coupled to the lower edges of said vertical panels to extend along the support surface in the direction opposite from said stabilizing panels; and
- strap arrangements extending laterally from said vertical panels to secure packages upright against said vertical panels and resting on said base panels.

17. A system as defined in claim 16 wherein said vertical panels are between 4 and 8 inches high.

18. A system as defined in claim 16 wherein said strapping arrangements are at least 3 inches wide.

19. A system as defined in claim 16 wherein said system is collapsible to a stored configuration with said panels stacked against one another, and with said strapping arrangements holding the panels in this stored configuration.

20. A system as defined in claim 19 wherein flexible coupling between at least some of said panels is implemented by resilient tapes which are both flexible and extensible.

* * * * *